(12) United States Patent
Tischer (10) Patent No.: US 7,774,161 B2
(45) Date of Patent: Aug. 10, 2010

(54) METHODS, SYSTEMS, AND COMPUTER PROGRAM PRODUCTS FOR PERFORMING DIFFERENTIAL MEDIA TIME CALCULATION AND DISPLAY

(75) Inventor: Steven Tischer, Atlanta, GA (US)

(73) Assignee: AT&T Intellectual Property, I, L.P., Reno, NV (US)

( * ) Notice: Subject to any disclaimer, the term of this patent is extended or adjusted under 35 U.S.C. 154(b) by 47 days.

(21) Appl. No.: 11/619,653

(22) Filed: Jan. 4, 2007

(65) Prior Publication Data

US 2008/0167836 A1    Jul. 10, 2008

(51) Int. Cl.
*G04F 3/00* (2006.01)

(52) U.S. Cl. .................. 702/176; 702/177; 702/178; 702/179; 702/182; 702/183; 702/184; 725/37; 725/40; 725/49; 725/51; 725/52; 725/53; 725/54; 725/131; 725/134; 348/552; 348/553; 348/569

(58) Field of Classification Search ......... 702/176–179, 702/182–184; 725/37, 40, 49, 51–54, 131, 725/134; 348/552, 553, 569
See application file for complete search history.

(56) References Cited

U.S. PATENT DOCUMENTS

| 6,915,528 B1* | 7/2005 | McKenna, Jr. ............. 725/37 |
| 2005/0015803 A1* | 1/2005 | Macrae et al. ............. 725/41 |

* cited by examiner

*Primary Examiner*—Sujoy K Kundu
(74) *Attorney, Agent, or Firm*—Cantor Colburn LLP (57) ABSTRACT

Methods, systems, and computer program products for performing differential media time calculation and display are provided. A method includes determining a time of media origination, determining a current time, and calculating a differential media time as a difference between the current time and the time of media origination. The method also includes using the differential media time to determine information update data and outputting the information update data for display.

20 Claims, 5 Drawing Sheets

METHODS, SYSTEMS, AND COMPUTER PROGRAM PRODUCTS FOR PERFORMING DIFFERENTIAL MEDIA TIME CALCULATION AND DISPLAY

BACKGROUND

The present invention relates generally to modification of media time information, and more particularly, to methods, systems, and computer program products for performing differential media time calculation and display.

In today's fast-paced information-rich environment, many viewers are unable to watch media as it is broadcast. Viewers may rely on devices, such as digital video recorders (DVRs), that store digital media data for later viewing. A DVR may enable a viewer to watch recorded media as a time delayed version of an original broadcast. While a DVR may allow a viewer to delay watching television shows, news, sporting events, and the like, the delay may result in displaying inaccurate and misleading time-sensitive information. For example, a television show broadcast may include overlaid time-sensitive textual information, such as the word "live", to indicate that the events depicted are being broadcast with a minimal delay. Other broadcasts may include overlaid time-sensitive textual information with warnings, such as "severe storm warning". Further broadcasts may include requests for viewing audience interaction, such as "phone lines are now open". Such time-sensitive information can result in viewer confusion, particularly if a viewer is unaware of the delay or has forgotten that she is viewing a delayed broadcast.

Media broadcasters may delay broadcasts or rebroadcast shows and events at a later time. Delayed broadcasts and rebroadcasts are common for sporting events and highlights, popular news stories, awards shows, or general filler material in late night and early morning hours. When an original broadcast contains overlaid textual information, a delay of the broadcast may include inaccurate or misleading time-sensitive information, in a similar manner as a DVR-based delay. A delay initiated by a media broadcaster is even more likely to confuse a viewer, because the delay is out of the viewer's control.

What is needed, therefore, is a way to provide differential media time calculation and display.

BRIEF SUMMARY

Exemplary embodiments include methods for performing differential media time calculation and display. A method includes determining a time of media origination, determining a current time, and calculating a differential media time as a difference between the current time and the time of media origination. The method also includes using the differential media time to determine information update data and outputting the information update data for display.

Exemplary embodiments further include systems for performing differential media time calculation and display. A system includes a media processing system. The system also includes logic executed by the media processing system. The logic implements a method. The method includes determining a time of media origination, determining a current time, and calculating a differential media time as a difference between the current time and the time of media origination. The method also includes using the differential media time to determine information update data and outputting the information update data for display.

Exemplary embodiments further include computer program products for performing differential media time calculation and display. A computer program product includes instructions for causing a computer to implement a method. The method includes determining a time of media origination, determining a current time, and calculating a differential media time as a difference between the current time and the time of media origination. The method also includes using the differential media time to determine information update data and outputting the information update data for display.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims. As a result of the summarized invention, technically a solution has been achieved in which textual overlays with time-sensitive information in media broadcasts can be modified to accurately present information at the time of display.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Media broadcasts may occur in a variety of formats through various modes of transmission for delivering visual content to a viewer. Exemplary media broadcast formats include multiple encoding standards for analog television, digital television, and Web video. Modes of transmission may include guided and unguided transmissions using electromagnetic or optical transmissions coupled with technologies such as cable, twisted pair, fiber, antenna, satellite, cellular, and other such waveguide or wireless technologies. When a media signal is received for viewing, it may be conditioned and reformatted for display. Inevitably there is at least a minimal time delay between a broadcast and display time, even for a "live" broadcast. The time delay between the broadcast and display time further increases when a recording and replay device is included in the path. As the time delay increases between the broadcast and display time, the accuracy and effectiveness of any time-sensitive information may be diminished.

A common approach to include time-sensitive information in media broadcasts is through the use of textual overlays. Textual overlays may appear on a region of a display as static or dynamic information on top of the underlying media. For example, a textual overlay may include words or phrases such as "live", "severe storm warning", or "phone lines are now open". When the time delay between the broadcast and display time is several days, a weather-related warning may no longer be in effect, and thus result in the display of misleading information. When a broadcast includes a request for viewer interaction, such as a call-in request, any time delay that extends the display time beyond the end of the broadcast may render the request for viewer interaction moot. Using methods for differential media time calculation and display, textual overlays with time-sensitive information in media broadcasts may be modified to accurately present information at the time of display.

Figure 1:
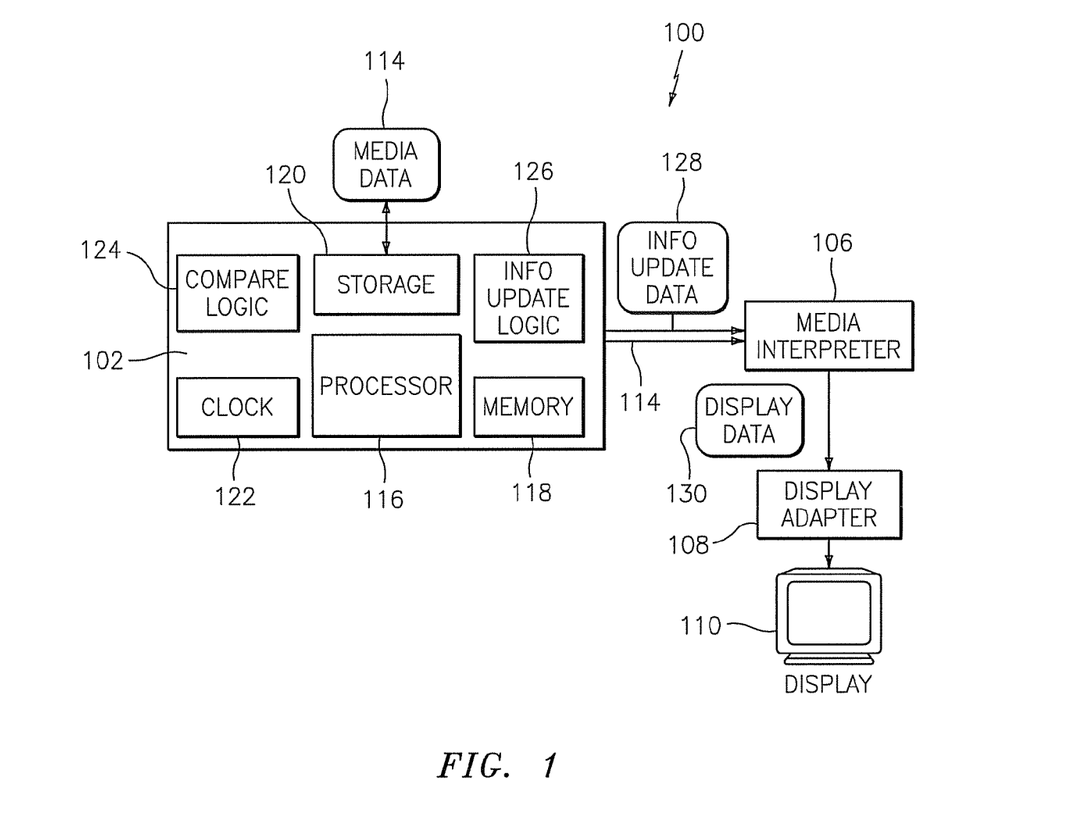
FIG. 1 is a block diagram of a system upon which differential media time calculation and display may be implemented in exemplary embodiments.

Referring flow to FIG. 1, a system 100 upon which differential media time calculation and display may be implemented is depicted. The system 100 of FIG. 1 includes a media processing system (MPS) 102, a media interpreter 106, a display adapter 108, and a display device 110. The MPS 102 includes a processor 116, a memory system 118, a storage device 120, a clock 122, compare logic 124, and information update logic 126. The display device 110 may be any type of program viewing device, such as a television, personal computer, etc. All or a portion of the elements described above with respect to the MPS 102 may be implemented via a client-side device, e.g., a television, using a set top box, personal recording device, and/or other similar elements. In alternative exemplary embodiments, all or a portion of these elements of the MPS 102 may be implemented over a network to various end user devices (e.g., the display device 110). In this embodiment, a service provider entity or content provider may implement the MPS 102. In further embodiments, the functionality of the elements of the MPS 102 may be shared between an end user and network entities.

In exemplary embodiments, the MPS 102 receives media data 114. The media data 114 may be in any format, broadcast through various modes of transmission for delivering visual content to a viewer (e.g., a viewer of the display device 110). For example, the media data 114 could represent an analog television signal broadcast through the air. In other embodiments, the media data 114 could represent a digital television signal broadcast through a coaxial cable or satellite collection. In further embodiments, the media data 114 could be a moving picture experts group (MPEG) encoded signal broadcast through an Internet connection. The media data 114 may represent a single channel isolated or extracted from multiple channels of information (e.g., media flow) streamed or otherwise transmitted over a network to an end user device (e.g., the display device 110) for display. The media data 114 may consist of metadata elements that describe the signals comprising the media data 114. For example, metadata elements may include data fields that describe the type of content of the media data 114, such as programming content, textual overlays, media formatting data, and other information. The metadata elements may be implemented, e.g., using current coding standards such as MPEG 7, which uses XML to store metadata for multimedia content formats.

The media data 114 may be recorded to, and retrieved from, the storage device 120 of the MPS 102 as controlled by the processor 116. The MPS 102 identifies the nature of the transmission signals of the media data 114 via, e.g., the metadata received in the media data 114. The metadata may be embedded in the media data 114.

The processor 116 may control the various resources of the MPS 102 including the movement of data to, from, and within the MPS 102. Although only one processor 116 is shown in the MPS 102 of FIG. 1, there may be multiple processors in communication with each other through a network or bus architecture. Furthermore, the processor 116 may include a combination of programmable logic devices and integrated circuits. The memory system 118 may include cache memory, program memory, and/or data memory. The processor 116 may utilize the memory system 118 for storing short-term buffer data, program variable data, or program code. The storage device 120 may be used for long-term storage, such as storing recordings of the media data 114. The clock 122 may provide a current time. The current time provided by the clock 122 may be in a format to support both a time of day and a calendar date determination.

The media data 114 may include a data structure or a framework that includes a media time of origination via, e.g., metadata elements embedded in the media data 114. In exemplary embodiments, the media time of origination refers to a time that serves as a reference point by which future events may be measured as described further herein. The media time of origination for the media data 114 may be established by the broadcaster of the media flow 112, upon receipt of the media flow 112, or upon storage of the media data 114 to the storage device 120.

The media time of origination may be inserted as metadata into the media data 114 (e.g., by the broadcaster at the time of broadcast, by an end user upon receiving the media data 114 or upon storing the media data 114, etc.). The insertion of the media time of origination may be implemented, e.g., using current coding standards such as MPEG 7, which uses XML to store metadata for multimedia content formats.

The compare logic 124 may be used to determine a differential media time as the difference between the current time provided by the clock 122 and the media time of origination of the media data 114. The differential media time may be compared to a programmable threshold value to determine whether the information update logic 126 should be invoked. In exemplary embodiments, the programmable threshold value may be assigned by a user of the MPS 102, programmed as part of the manufacturing process for the MPS 102, or updated in the field provided by the programmable logic. For example, a viewer may enter a threshold value via, e.g., a user interface provided on display device 110 that indicates the conditions (e.g., if time differential exceeds 15 minutes) under which the viewer would like an updated text message to be provided (e.g., as a textual overlay within a program or media display). When the compare logic 124 determines that the differential media time exceeds the programmable threshold value, the information update logic 126 may analyze and update time-sensitive information.

The information update logic 126 may use the differential media time in combination with preexisting message data to produce information update data 128. The information update logic 126 may also use information in the media data 114 to determine an appropriate message. Message text may be retrieved from the storage device 120 or extracted from the media data 114. For example, if the differential media time is two days, the value of "2 days" may be inserted between two parts of message text, where the first part is "(as of" and the second part is "ago)", resulting in the information update data 128 equal to "(as of 2 days ago)". The information update logic 126 may combine the message text and the differential media time in the information update data 128. In exemplary embodiments, the message text and the differential media time may be included as separate fields of the information update data 128 for interpretation by the media interpreter 106. In exemplary embodiments, information update data 128 includes messages provided to a viewer that contain updated textual overlays for a corresponding media element. It will be understood that the information update data 128 may be instantiated and presented with the media data 114 in response to varying conditions. For example, if the information update data 128 is processed and prepared at a server-side location (e.g., broadcaster network), then the media data that includes the information update data 128 may be parsed at the client-side device (e.g., media device 110) based upon criteria established at the client-side device. As a result, suppose that a user at the media device 110 enters a threshold value such that the information update data 128 may or may not be instantiated at the media device 110 based upon whether the threshold criteria set by the user has been met or via other suitable filtering mechanism. Thus, the media time calculations and display activities may be implemented using tunable parameters that determine how, where, and when information update data 128 may be instantiated. In this manner, one media device 110 at a first household may receive different information update data 128 than a media device at a second neighboring household.

In further exemplary embodiments, the media data 114 may include a transition sequence. The transition sequence may include a pre-transition time message, a transition time, and a post-transition time message. For example, a pre-transition time message may be "phone lines are now open"; a transition time may be "Sep. 21, 2006, 10 P.M. E.S.T."; and a post-transition time message may be "phone lines are now closed". When the media data 114 includes a transition sequence, the compare logic 124 may compare the current time with the transition time as a trigger to invoke the information update logic 126. The information update data 128 may include the pre-transition time message when the current time is earlier than the transition time, and the post-transition time message may be included when the current time is later than the transition time.

The media interpreter 106 may receive the media data 114 and the information update data 128. When there is no information update data 128 generated by the MPS 102, the media interpreter 106 may only receive the media data 114. The media interpreter 106 converts all input data, such as the media data 114 and the information update data 128, into display data 130. The display data 130 reflects the media data 114 with, e.g., an updated textual overlay. The display adapter 108 receives the display data 130 and converts the information into signals compatible with the display device 110. For example, if the media data 114 and the information update data 128 are in an MPEG format, the media interpreter 106 may combine the inputs to produce the display data 130 in a composite video format. Continuing with the example, the display adapter 108 may then convert the display data 130 to a national television system committee (NTSC) format if the display device 110 is a traditional analog cathode ray tube (CRT). The display device 110 may be any type of display device capable of producing viewable images, including: a CRT, a liquid crystal display (LCD), a plasma display, or a projection display.

Although the MPS 102, the media interpreter 106, the display adapter 108, and the display device 110 are depicted as separate elements of the system 100 of FIG. 1, it will be understood by one skilled in the art that each element may be combined into various subgroups or a single integrated system. Furthermore, each element of the system 100, including the sub-components of the MPS 102 may be distributed in any combination between a broadcaster of the media flow 112 and a viewer of the display device 110. For example, the MPS 102 and the media interpreter 106 may be local to the broadcaster, while the display adapter 108 and the display device 110 may be local to the viewer. In further exemplary embodiments, the display adapter 108 may be integrated with the display device 110.

Figure 2:
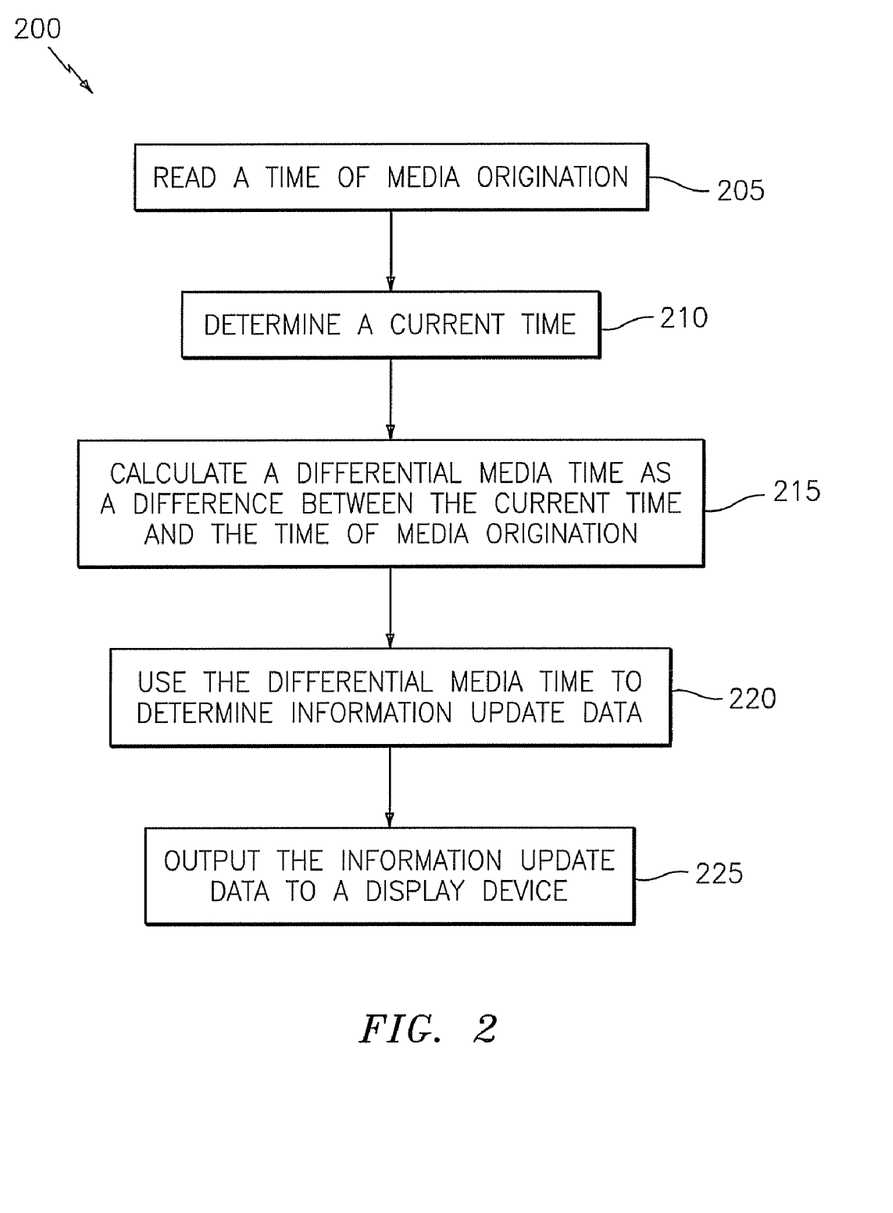
FIG. 2 is a flowchart describing a process for implementing differential media time calculation and display in exemplary embodiments.

Turning now to FIG. 2, a process for performing differential media time calculation and display will now be described in accordance with exemplary embodiments. The media data 114 may be extracted from the media flow 112 or may be retrieved from the data storage device 120. At step 205, the MPS 102 determines a time of media origination for the media data 114. The time of media origination may be extracted from the media data 114. At step 210, the MPS 102 determines the current time through accessing the clock 122. At step 215, the MPS 102 calculates the differential media time as the difference between the current time and the time of media origination via the compare logic 124. At step 220, the MPS 102 uses the differential media time to determine the contents of the information update data 128 via the information update logic 128. The MPS 102 may extract a transition sequence from the media data 114 to determine the contents of the information update data 128. The information update data 128 may combine a message with the differential media time to create, modify, or replace time-sensitive information in the media data 114. At step 225, the information update data 128 is output to the display device 110 as part of the display data 130. The display data 130 may be generated by the media interpreter 106 through appending, inserting, replacing, or otherwise modifying a predetermined portion of the media data 114 with the information update data 128.

Figure 3A:
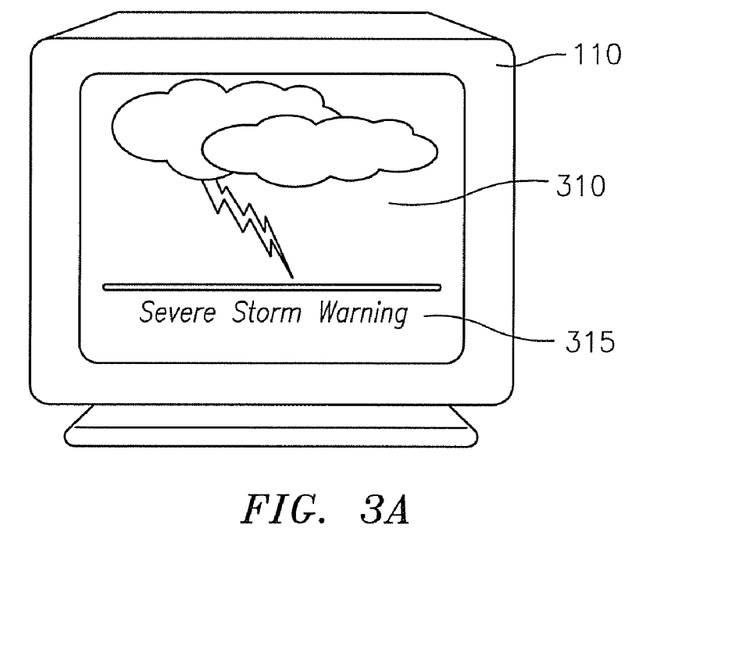
FIG. 3A is an exemplary display output before applying differential media time calculation and display in exemplary embodiments.
Figure 3B:
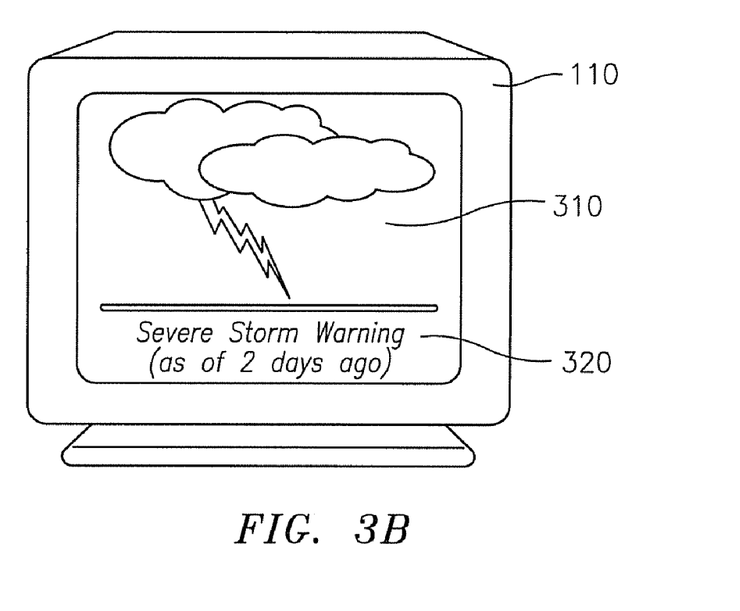
FIG. 3B is an exemplary display output after applying differential media time calculation and display to modify time-sensitive textual information in exemplary embodiments.

Turning now to FIGS. 3A and 3B, exemplary images visible to a viewer of the display device 110 are depicted before and after applying differential media time calculation and display in accordance with exemplary embodiments. In both FIGS. 3A and 3B, the display device 110 is depicted with an image 310 as produced by the media interpreter 106 and the display adapter 108 from the media data 114. FIG. 3A also includes time-sensitive textual information 315, which is part of the media data 114. In exemplary embodiments, the time-sensitive textual information 315 is "Severe Storm Warning", indicating that a weather alert is in effect. The combined image 310 and time-sensitive textual information 315 in FIG. 3A do not include any information updates from the MPS 102. The MPS 102 may determine that the difference between the current time and the time of media origination for the media data 114 associated with the image 310 exceeds a programmable threshold value, triggering the creation of the information update data 128. The media interpreter 106 combines the information update data 128 with the media data 114 to produce the display data 130, depicted in FIG. 3B as the image 310 and the updated message text 320. In this example, the image 310 remains unchanged, but the time-sensitive textual information 315 has been modified as the updated message text 320 by adding "(as of 2 days ago)".

Figure 4A:
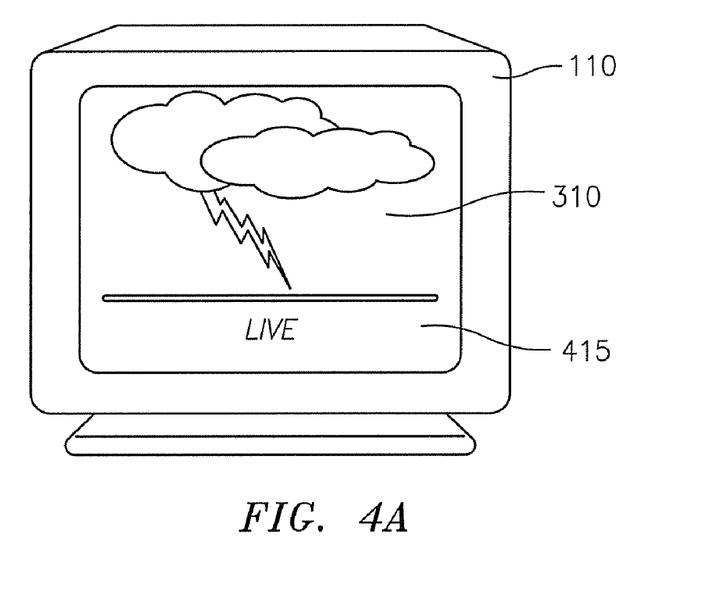
FIG. 4A is an exemplary display output before applying differential media time calculation and display in exemplary embodiments.
Figure 4B:
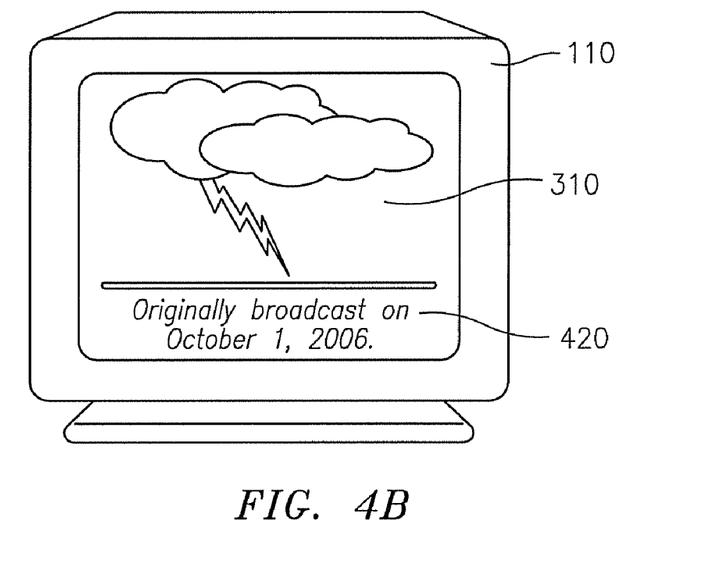
FIG. 4B is an exemplary display output after applying differential media time calculation and display to replace time-sensitive textual information in exemplary embodiments.

Turning now to FIGS. 4A and 4B, further exemplary images visible to a viewer of the display device 110 are depicted before and after applying differential media time calculation and display in accordance with exemplary embodiments. In both FIGS. 4A and 4B, the display device 110 is depicted with an image 310 as produced by the media interpreter 106 and the display adapter 108 from the media data 114. FIG. 4A also includes time-sensitive textual information 415, which is part of the media data 114. In exemplary embodiments, the time-sensitive textual information 415 is "Live", indicating that a minimal time delay exists between the broadcast and display of the media data 114. The combined image 310 and time-sensitive textual information 415 in FIG. 4A do not include any information updates from the MPS 102. The MPS 102 may determine that the difference between the current time and the time of media origination for the media data 114 associated with the image 310 exceeds a programmable threshold value, triggering the creation of the information update data 128. The media interpreter 106 combines the information update data 128 with the media data 114 to produce the display data 130, depicted in FIG. 4B as the image 310 and the updated message text 420. In this example, the image 310 remains unchanged, but the time-sensitive textual information 415 has been replaced as updated message text 420 indicating the time of media origination as a date in the message, "Originally broadcast on Oct. 1, 2006."

Figure 5A:
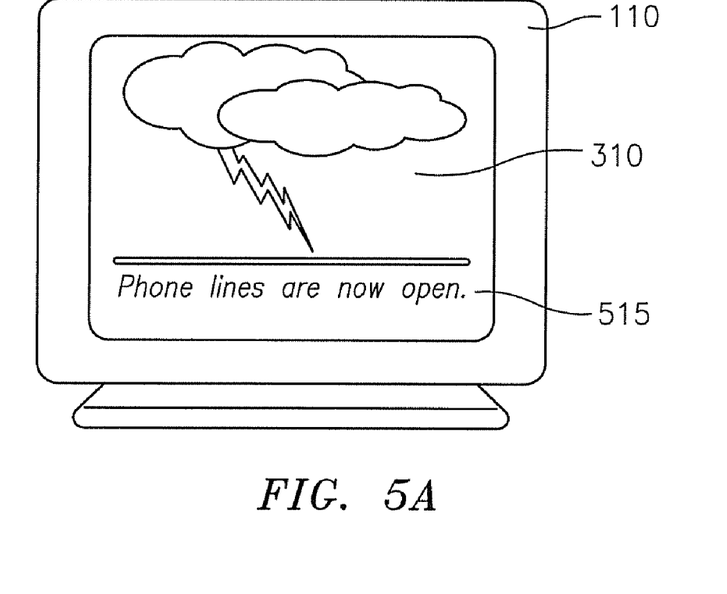
FIG. 5A is an exemplary display output before applying differential media time calculation and display in exemplary embodiments.
Figure 5B:
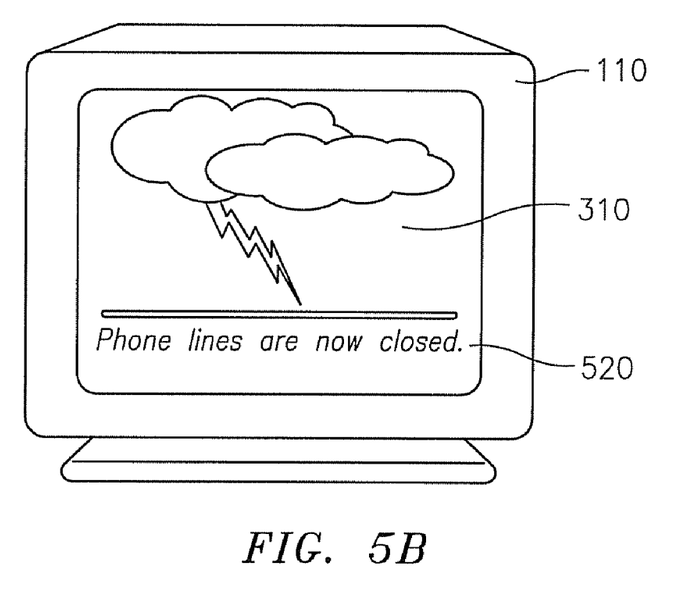
FIG. 5B is an exemplary display output after applying differential media time calculation and display to replace time-sensitive textual information using a transition sequence in exemplary embodiments.

Turning now to FIGS. 5A and 5B, further exemplary images visible to a viewer of the display device 110 are depicted before and after applying differential media time calculation and display in accordance with exemplary embodiments. In both FIGS. 5A and 5B, the display device 110 is depicted with an image 310 as produced by the media interpreter 106 and the display adapter 108 from the media data 114. FIG. 5A also includes time-sensitive textual information 515, which is an example of a pre-transition time message in a transition sequence in the media data 114. In exemplary embodiments, the time-sensitive textual information 515 is a pre-transition time message, "Phone lines are now open"; indicating that the current time has not exceeded the transition time as extracted from a transition sequence in the media data 114. The MPS 102 may determine that the current time has exceeded the transition time as extracted from a transition sequence in the media data 114, triggering the creation of the information update data 128 with a post-transition time message. The post-transition time message may be extracted from a transition sequence in the media data 114. The media interpreter 106 combines the information update data 128 with the media data 114 to produce the display data 130, depicted in FIG. 5B as the image 310 and the updated message text 520. In this example, the image 310 remains unchanged, but the time-sensitive textual information 515 has been replaced as updated message text 520 indicating that the pre-transition time message is no longer valid through the message, "Phone lines are now closed."

Although in the examples depicted in FIGS. 3A, 3B, 4A, 4B, 5A, and 5B, the updated message text 320, 420, and 520 modified or replaced the time-sensitive textual information 315, 415, and 515 respectively in the lower region of the display device 110, this should not be construed as limiting in scope. Any visible region of the display device 110 may be replaced or modified in accordance with exemplary embodiments.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for performing differential media time calculation and display, the method comprising:
   determining, via a computer processor, a time of media origination for a media stream, the media stream including an overlay comprising a first set of data;
   determining, via the computer processor, a current time;
   calculating, via the computer processor, a differential media time as a difference between the current time and the time of media origination;
   receiving a threshold value from an end user device;
   upon determining the differential media time exceeds the threshold value, using, via the computer processor, the differential media time to determine information update data for the overlay, the information update data comprising a second set of data that is different from the first set of data; and
   outputting, via the computer processor, the media and an overlay containing the information update data for display;
   wherein the media time of origination specifies a time, the time serving as a reference point by which future events are measured, wherein the media time of origination is inserted into the media by the end user device upon receiving the media.

2. The method of claim 1, wherein the time of media origination is extracted from media data.

3. The method of claim 2, wherein the media data includes a transition sequence comprising:
   a pre-transition time message;
   a transition time; and
   a post-transition time message.

4. The method of claim 3, wherein the information update data includes:
- the pre-transition time message when the current time is earlier than the transition time, wherein the pre-transition time message is formatted as a textual message that overlays media to which the pre-transition time message relates; and
- the post-transition time message when the current time is later than the transition time, wherein the post-transition time message is formatted as a textual message that overlays media to which the post-transition time message relates.

5. The method of claim 2, wherein the media data is extracted from a media flow.

6. The method of claim 1, further comprising:
- updating data in the overlay each time the media stream is viewed, the information updated based on the differential media time.

7. The method of claim 2, wherein outputting the information update data for display includes replacing information in the media data with the information update data.

8. The method of claim 1, wherein the information update data includes:
- a message; and
- the differential media time.

9. A system for performing differential media time calculation and display, comprising:
- a media processing system; and
- logic executed by the media processing system, the logic performing a method comprising:
  - determining a time of media origination for a media stream, the media stream including an overlay comprising a first set of data;
  - determining a current time;
  - calculating a differential media time as a difference between the current time and the time of media origination; and
  - receiving a threshold value from an end user device;
  - upon determining the differential media time exceeds the threshold value, using the differential media time to determine information update data for the overlay, the information update data comprising a second set of data that is different from the first set of data;
- a media interpreter in communication with the media processing system; and
- a display adapter in communication with the media interpreter, the display adapter performing:
  - outputting the media and an overlay containing the information update data for display;
  - wherein the media time of origination specifies a time, the time serving as a reference point by which future events are measured, wherein the media time of origination is inserted into the media by the end user device upon receiving the media.

10. The system of claim 9, wherein the time of media origination is extracted from media data.

11. The system of claim 10, wherein the media data includes a transition sequence comprising:
- a pre-transition time message;
- a transition time; and
- a post-transition time message.

12. The system of claim 11, wherein the information update data includes:
- the pre-transition time message when the current time is earlier than the transition time, wherein the pre-transition time message is formatted as a textual message that overlays media to which the pre-transition time message relates; and
- the post-transition time message when the current time is later than the transition time, wherein the post-transition time message is formatted as a textual message that overlays media to which the post-transition time message relates.

13. The system of claim 10, wherein the media data is extracted from a media flow.

14. The system of claim 9, wherein the method further comprises updating the data in the overlay each time the media stream is viewed, the information updated based on the differential media time.

15. The system of claim 10, wherein outputting the information update data for display includes replacing information in the media data with the information update data.

16. The system of claim 9, wherein the information update data includes:
- a message; and
- the differential media time.

17. A non-transitory computer program product for performing differential media time calculation and display, the computer program product includes instructions embedded in a computer readable medium for implementing the method, comprising:
- determining a time of media origination;
- determining a current time;
- calculating a differential media time as a difference between the current time and the time of media origination;
- receiving a threshold value from an end user device;
- upon determining the differential media time exceeds the threshold value, using the differential media time to determine information update data for the overlay, the information update data comprising a second set of data that is different from the first set of data; and
- outputting the media and an overlay containing the information update data for display;
- wherein the media time of origination specifies a time, the time serving as a reference point by which future events are measured, wherein the media time of origination is inserted into the media by the end user upon receiving the media.

18. The computer program product of claim 17, wherein the time of media origination is extracted from media data; and
- the method includes updating data in the overlay each time the media stream is viewed, the information updated based on the differential media time.

19. The computer program product of claim 18, wherein the media data includes a transition sequence comprising:
- a pre-transition time message;
- a transition time; and
- a post-transition time message.

20. The computer program product of claim 19, wherein the information update data includes:
- the pre-transition time message when the current time is earlier than the transition time, wherein the pre-transition time message is formatted as a textual message that overlays media to which the pre-transition time message relates; and
- the post-transition time message when the current time is later than the transition time, wherein the post-transition time message is formatted as a textual message that overlays media to which the post-transition time message relates.

* * * * *